July 23, 1963 R. E. WADE ETAL 3,098,529
PLOW CLAMPING MEANS
Filed March 7, 1960 2 Sheets-Sheet 2
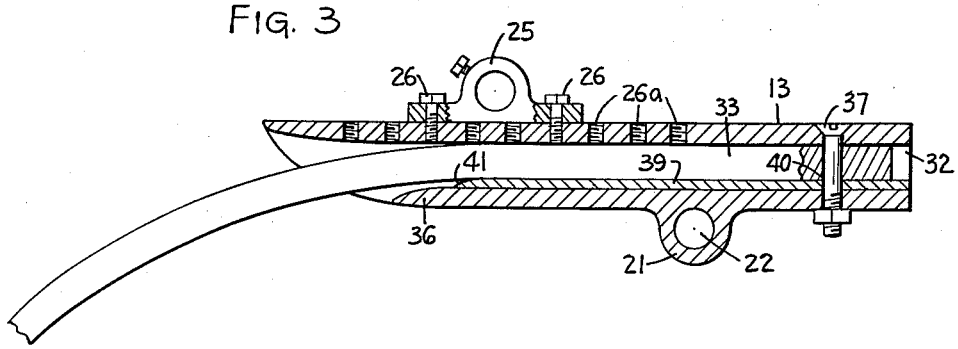
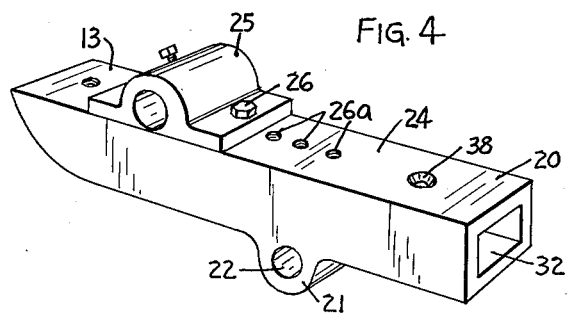
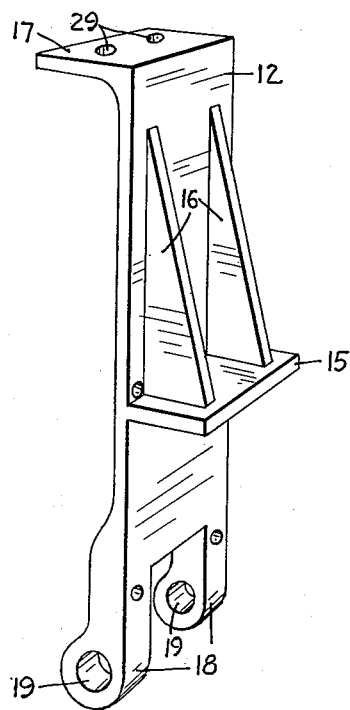
INVENTORS
ROBERT EDGAR WADE
WILLIAM CECIL WADE
BY Frederick C. Meyers
ATTORNEYS 3,098,529
PLOW CLAMPING MEANS
Robert Edgar Wade and William Cecil Wade,
Consort, Alberta, Canada
Filed Mar. 7, 1960, Ser. No. 13,264
6 Claims. (Cl. 172—265)

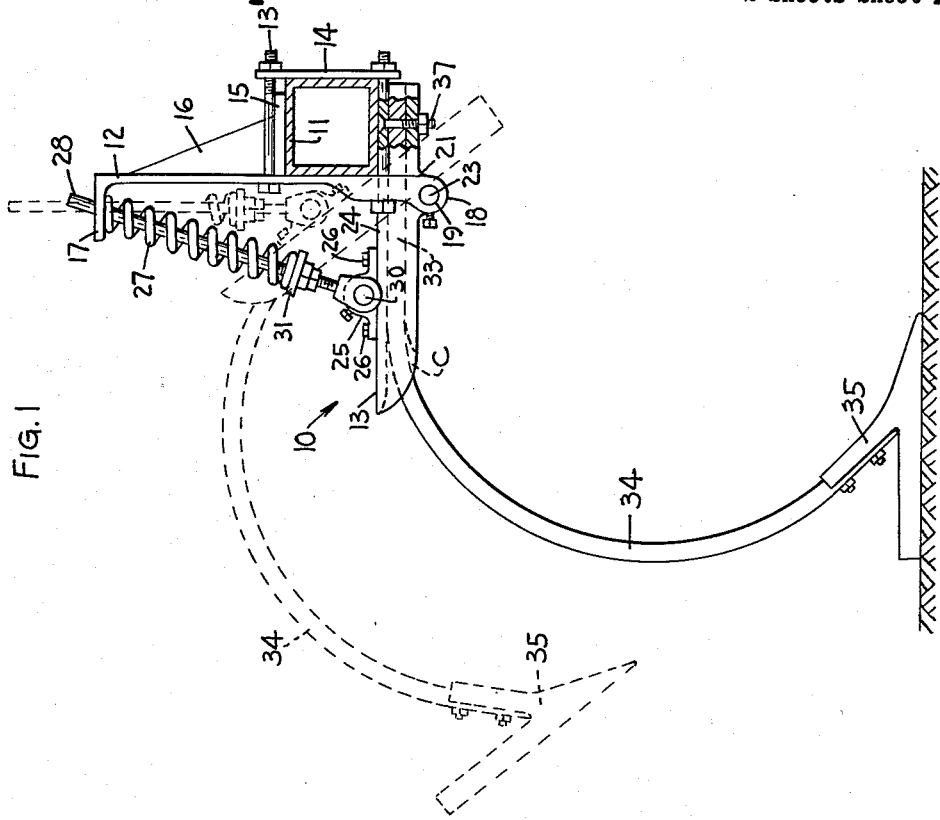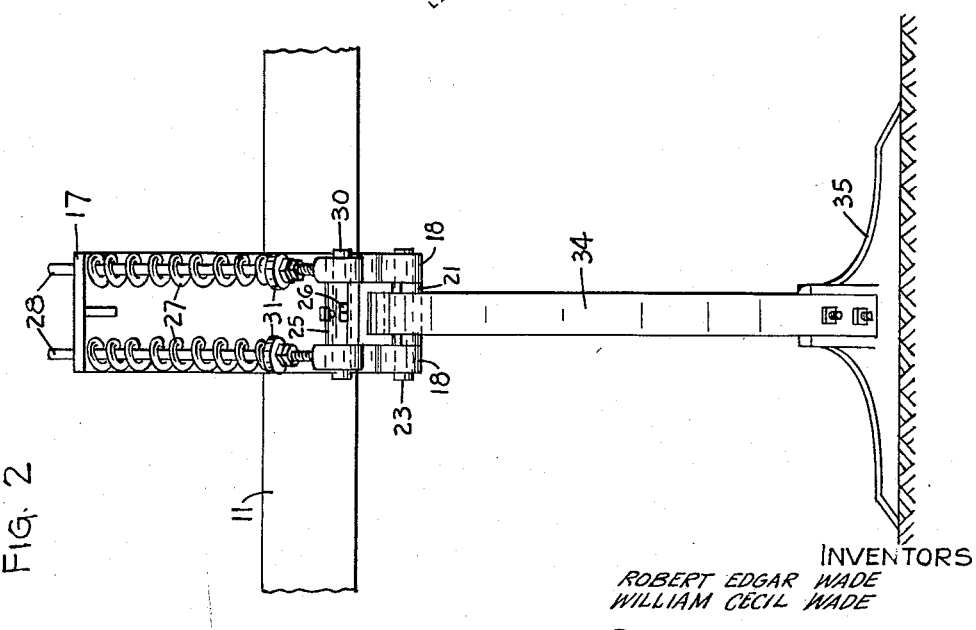

This invention relates to plow clamps, and more particularly to a resilient plow clamp.

It is known in the art to provide a plow clamp which will allow for the movement of the plow in an upward direction upon the plow striking a rock or other hard impenetrable object.

In many prior art devices, a force is applied to maintain the plow member in the ground, and when the member strikes a rock or encounters hard ground, the force that must be overcome in lifting the plow member from the ground increases directly with degree of lift. A plow member may be caused to raise from the ground by striking a rock, and as the rock may tend to roll upwardly, the plow member is raised against increasing spring force which causes the plow member, or the shank supporting it to break. In our invention, we provide a resilient mounting means wherein the pivotal mounting controls the amount of force applied at various raised positions of a plow member, yet allows for the automatic resetting of said plow member after the resisting condition is past.

Our invention, therefore, comprehends a resilient plow clamp which embodies the structure necessary to continuously urge the plow into the soil and, further, to expeditiously allow upward movement of the plow when a hard object is encountered in the path of said plow.

It is, therefore, an object of our invention to provide a spring plow clamp for positively engaging soil to be plowed and yet capable of quick movement therefrom when an obstacle is encountered.

It is another object of our invention to provide a plow clamp means that will reset the plow member automatically after being upwardly repelled from the soil, the increased force at the lower portion and the pulling effect of the soil on the moving member causing it to be rapidly returned to normal operating position.

It is another object of our invention to provide a plow clamping means having a novel pivoting and spring arrangement which causes increased force to be applied to the plow member when it is initially raised, then to cause a lesser rate of increase, or actual decrease, in the force applied when the plow member is required to raise beyond a predetermined position.

These and other objects and advantages of our invention will more fully appear from the following description, made in connection with the accompanying drawings, wherein like reference characters refer to the same or similar parts throughout the several views and in which:

FIGURE 1 is a side elevational view of our novel spring plow clamp attached to a carrier means;

FIGURE 2 is a rear elevational view of the clamp of FIGURE 1;

FIGURE 3 is an enlarged sectional view of the support box of FIGURE 4;

FIGURE 4 is a perspective view of our clamp support box; and

FIGURE 5 is a perspective view of our plow clamp plate.

With continued reference to the drawings, FIG. 1 discloses a spring plow clamp 10 mounted on frame 11 of a multiple plow carrier (not shown). A plurality of plow clamps are ordinarily mounted on a carrier. However, only a single plow clamp need be described to disclose our invention. A main support mounting plate 12 is secured to the frame 11 by bolts 13' passing through mounting plate 12 and front plate 14. Mounting plate 12 is provided with a flange 15 cast integrally therewith and additionally supported by inclined supports 16 (FIG. 5). The flange 15 abuts the top of frame 11 and when attached to the frame as hereinabove described the mounting plate 12 forms a rigid stable plate on which the remainder of the plow clamp structure is mounted. Mounting plate 12 is provided with an upper flange 17 and a lower bifurcated bearing support portion 18 which is provided with bearing openings 19.

An elongated support box 13, 20 having a bearing portion 21 and an opening 22 therethrough is mounted between the bearing support 18 and is pivotally supported relative to mounting plate 12 by a bearing pin 23 (FIG. 1). When the support box 20 is pivotally mounted on mounting plate 12 the upper surface 24 abuts the frame 11 to prevent further rotation in a counter clockwise direction as viewed in FIG. 1. Mounted on upper surface 24 of support box 20 is a bearing block 25 which is secured to box 20 as by bolts 26 passing through a pair of preselected openings 26a (FIG. 4).

Referring now to FIGS. 1 and 2, a pair of springs 27 surround rods 28 which extend through openings 29 in flange 17 to a pin 30 mounted for rotational movement in block 25. The springs 27 engage flange 17 and are compressed by members 31 threadably surrounding each rod 28 at the lower end thereof. It will be noted that springs 27, mounting plate 12 and support box 20 form a triangular configuration, the mounting plate providing one leg from pivot pin 23 to flange 17, support box 20 providing another leg from pin 23 to pivot pin 30 and springs 27 and rods 28 themselves providing the third leg from pin 30 up to flange 17.

Support box 20 is provided with an elongated opening 32 therethrough to receive spring shank portion 33 of plow member 34. Plow member 34 may terminate in a shoe 35 which is designed to penetrate the soil when operably used. The elongate opening 32 is substantially parallel with the top surface 24 of box 20 until it reaches the end of the box from which spring shank portion 33 extends. At this rearward end portion 36, opening 32 is divergent to present a smooth tapering surface to the spring shank portion 33. Such a divergent opening lessens the possibility of breaking the spring shank by eliminating contact with a sharp edge, corner or the like.

The shank portion 33 of plow member is secured in box 20 by a bolt 37 passing through opening 38 and the spring shank portion 33. This single point securement of the plow member has been found to be sufficient for holding it in position as the spring shank portion 33 is contacted within box 20 along end portion 36 of said box and as a result the portion 33 when bent under stress does not concentrate strain at one position.

It should be noted that the action of springs 27 is in a direction to maintain the box 20 against the frame 11 and consequently acts to maintain the plow member in the soil at a preselected position. If members 31 are tightened the spring action becomes greater and thus the forces acting on box 20 at bearing block 25 is sufficient to resist the upward movement by the plow member moving through the soil.

When the plow member 34 or its shoe 35 does strike a rock, stump or the like which resists removal, the forward motion of the carrier will increase the force of the plow member striking the object and as a result the forces applied to the plow member will cause the plow member and shank 33 to move in an upward clockwise direction (as viewed in the drawings) and will cause box 20 to pivot about pin 23 as the force of the springs 27 are overcome. The spring force at first increases rapidly, but if it is not sufficient to maintain the plow member in the soil, it is then raised under a declining rate of force until it reaches the position shown in the dotted line of FIG. 1. Regardless of the position of box 20 there is still spring force available and active on pin 30 extending through block 25, and this spring force is available to return the plow member 34 to the soil and assists the plow member in seeking the preselected depth for plowing. It should be noted that the pivot pins 23 and 30 may advantageously be aligned in a plane angularly disposed with respect to the horizontal to permit more rapid movement of the plow member 34 from the soil when an object is struck or the soil becomes impenetrable as hereinabove described. As the support box 20 is upwardly pivoted about pin 23 the spring members 27 will change in length and will also form a different angle with respect to the mounting plate 12 as well as support box 20.

As soil conditions may vary it is advantageous to provide some latitude in the selection of the point at which the spring force will be applied. For example, a greater force can be applied to the plow member 34 by either increasing the spring force at a designated point along box 20 or the spring force can be increased by mounting bearing block 25 toward the end of box 20 away from pivot pins 23. In other words, an increase in mechanical advantage can be accomplished by the adjustment of block 25.

Referring now to FIG. 3 we show a shim plate 39 which may be inserted within the opening 32 of the box 13. If the shank portion 33 is of lesser thickness than the maximum acceptable between opening 32, then a shim 39 of appropriate thickness may be employed to fill the intervening space. Shim 39 is provided with an opening 40 to receive the bolt fastener 37 and may be provided with a curved rearward edge 41 which also prevents the sharp edged application of force to shank 33 in the same manner as previously described in connection with the divergent rearward end 36 of the box 13'.

It will, of course, be understood that various changes may be made in the form, details, arrangements and proportions of the parts without departing from the scope of our invention as set forth in the appended claims.

What we claim is:

1. A clamp assembly for mounting a chisel plow to a plow frame comprising, a mounting plate adapted to be secured to a plow frame, said mounting plate having a pivot bearing, a clamp box pivotally supported by said pivot bearing, said clamp box being provided with a longitudinal opening therethrough for receiving a plow shank, and biasing means joining said clamp box and said mounting plate at positions mutually spaced with respect to said pivot bearing for rotating, whereby a chisel plow mounted in said clamp box will be urged into the ground but capable of being forced out under initial increasing and then subsequent decreasing resistance from said biasing means.

2. A clamp assembly for mounting a chisel plow to a plow frame which comprises, an upstanding mounting plate, securing means attached to rigidly hold said mounting plate on a plow frame, an elongate clamp box having pivotal securement intermediate its ends with said mounting plate and normally angulated with respect thereto, clamping means adapted to hold the upper shank portion of a chisel plow within said clamp box, a spring means pivotally mounted at one end thereof to said clamp box at a position in spaced relation with said pivotal securement with said mounting plate, said spring means bearing at its other end against the mounting plate at a position in spaced relation with respect to said pivotal securement, said spring means changing its angle with respect to both the mounting plate and the support box upon forcible raising of the support box, whereby said spring means will first offer increasing resistance and upon further raising of the support box will offer diminishing resistance thereto.

3. A chisel plow comprising, a main frame member, a plow clamp support means releasably mounted on said main frame member and having a bifurcated lower portion, an elongate clamp box pivotally mounted intermediate its ends at said bifurcated lower portion to allow upward movement of the rearward portion of said clamp box, said clamp box having an opening longitudinally therein to receive a shank member, a plow member having its shank secured within said opening of said clamp box, an adjustable pivot means mounted on said clamp box outwardly of said bifurcated lower portion, and spring means resiliently interconnecting said adjustment means and said plow clamp support to urge the plow member into the soil.

4. The structure set forth in claim 1 wherein the longitudinal opening enlarges divergently at the rearward end of said box for distributing bending forces to prevent breakage of the plow shank.

5. A clamping assemblage for a resiliently mounted plow member comprising, a mounting plate adapted to be mounted on a frame, said mounting plate being provided at its lower portion with a bearing member and at its upper portion with a flange, an elongate shank supporting member having a longitudinal opening therethrough and being pivotally mounted intermediate its ends to said bearing member, a spring means adapted to be pivotally secured at one of a plurality of positions along said elongate shank supporting member, said spring means further extending to and engaging with said flange for urging the rearward portion of said elongate shank supporting member downwardly, said spring means normally lying in angulated relation with respect to said mounting plate, and a plow member including a shank portion mounted in said elongate shank supporting member and movable within said longitudinal opening, whereby said plow member will engage the soil as the spring means urges said elongate shank supporting member downwardly from said frame.

6. A chisel plow comprising a main frame member having a side face and a bottom face, a mounting plate releasably mounted against the side face of said main frame member and having a pivotal bearing at its lower portion, an elongate clamp box pivotally supported intermediate its ends by said pivot bearing and having a forward portion thereof normally in pressing engagement with the bottom of said main frame member and having a rearward portion extending rearwardly of said pivot bearing, said clamp box having an opening formed longitudinally therein to receive a shank member, a plow member having its shank secured within the opening of said clamp box, an adjustable pivot means mounted on said clamp box rearwardly of said main frame member and upwardly of said pivot bearing, and spring means resiliently interconnecting said pivot means and said mounting plate, whereby to normally maintain said plow member operably extended into the soil.

References Cited in the file of this patent
UNITED STATES PATENTS

| | | |
|---|---|---|
| 1,068,868 | Dugger | July 29, 1913 |
| 2,906,353 | Rogers | Sept. 29, 1959 |
| 2,944,613 | Anderson | July 12, 1960 |

FOREIGN PATENTS

| | | |
|---|---|---|
| 1,129,076 | France | Sept. 3, 1956 |